United States Patent
Fitchpatrick et al.

(10) Patent No.: US 7,757,651 B2
(45) Date of Patent: Jul. 20, 2010

(54) FUEL CONTROL SYSTEM HAVING COLD START STRATEGY

(75) Inventors: Curtis Lyle Fitchpatrick, Williamsfield, IL (US); Brian Gene Wheeler, Metamora, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 12/003,653

(22) Filed: Dec. 28, 2007

(65) Prior Publication Data
US 2009/0165762 A1 Jul. 2, 2009

(51) Int. Cl.
*F02N 19/00* (2010.01)
(52) U.S. Cl. ............... 123/179.8; 123/576; 123/491
(58) Field of Classification Search .......... 123/1 A, 123/27 GE, 179.1, 179.4, 299, 300, 304, 123/305, 492, 493, 525, 575, 576, 577, 578, 123/675, 678, 698
See application file for complete search history.

(56) References Cited

U.S. PATENT DOCUMENTS

| | | | |
|---|---|---|---|
| 3,827,417 A * | 8/1974 | Morita | 123/575 |
| 3,960,131 A | 6/1976 | Davis | |
| 4,202,309 A | 5/1980 | Burke | |
| 4,326,485 A | 4/1982 | Burke | |
| 4,402,296 A * | 9/1983 | Schwarz | 123/575 |
| 4,522,164 A * | 6/1985 | Frankle et al. | 123/179.14 |
| 4,928,642 A | 5/1990 | Atkinson et al. | |
| 4,957,083 A * | 9/1990 | Nakaniwa et al. | 123/436 |
| 4,984,552 A | 1/1991 | Nishizawa et al. | |
| 5,072,578 A * | 12/1991 | Moore, Jr. | 60/39.281 |
| 5,097,803 A | 3/1992 | Galvin | |
| 5,184,585 A * | 2/1993 | Wilson | 123/179.8 |
| 5,367,996 A | 11/1994 | Homik et al. | |
| 5,388,553 A * | 2/1995 | Burke et al. | 123/179.8 |
| 5,447,138 A * | 9/1995 | Barnes | 123/446 |
| 5,540,193 A | 7/1996 | Achten et al. | |
| 5,682,864 A | 11/1997 | Shirakawa | |
| 6,526,938 B1 | 3/2003 | Bylsma et al. | |
| 6,705,278 B2 | 3/2004 | McGee et al. | |
| 2001/0015193 A1 * | 8/2001 | Tanaka et al. | 123/300 |
| 2003/0062028 A1 | 4/2003 | Kitagawa et al. | |
| 2005/0217638 A1 | 10/2005 | Kaneko | |
| 2007/0028861 A1 | 2/2007 | Kamio et al. | |
| 2007/0028881 A1 * | 2/2007 | Nakata et al. | 123/179.15 |

* cited by examiner

*Primary Examiner*—Stephen K Cronin
*Assistant Examiner*—Anthony L Bacon
(74) *Attorney, Agent, or Firm*—Finnegan, Henderson, Farabow, Garrett & Dunner; Shital A. Shah

(57) ABSTRACT

The present disclosure is directed to a method of operating an engine. The method may include injecting a primary fuel. The method may further include determining a need for a secondary fuel during starting of the engine and introducing the secondary fuel. The method may still further include determining an engine acceleration rate. The method may also include inhibiting the introduction of the secondary fuel when the engine acceleration rate is below an expected acceleration rate.

20 Claims, 3 Drawing Sheets

FUEL CONTROL SYSTEM HAVING COLD START STRATEGY

TECHNICAL FIELD

The present disclosure relates generally to a fuel control system and, more particularly, to a fuel control system having a cold start strategy.

BACKGROUND

Engines use injectors to introduce fuel into the combustion chambers of the engine. The injectors may be hydraulically or mechanically actuated with mechanical, hydraulic, or electrical control of fuel delivery. Machines that use these engines may be operated in less than ideal atmospheric conditions such as at high altitudes or in cold weather. Under these conditions, particularly cold conditions, an engine may have trouble maintaining the temperature required to sustain combustion of the injected fuel. Repeated failed attempts to start an engine in cold conditions may result in excessive wear of the engine.

One way to improve starting and/or operation in cold conditions is to introduce a starting fluid, in addition to a normal fuel, into the engine to assist in starting the engine. This starting fluid is a highly flammable liquid that may allow for a higher combustion temperature during cold start conditions and may facilitate operation of an engine that might not otherwise start.

One system for introducing starting fluid into an engine is described in U.S. Pat. No. 5,388,553 (the '553 patent), issued to Burke et al. on Feb. 14, 1995. The '533 patent describes a system that introduces an ether mixture into an engine when an engine coolant temperature is below a predetermined temperature and when an engine speed is within a predetermined speed range. Specifically, the system of the '533 patent begins to introduce ether into the engine when the engine coolant temperature is below 40° F. and when the engine speed is greater than 80 RPM and less than 1800 RPM. The system of the '553 patent stops introducing ether when the engine speed exceeds 1800 RPM regardless of engine coolant temperature. The system of the '553 patent does not introduce ether into the engine if the engine coolant temperature is initially greater than 40° F., regardless of engine speed.

While prior art systems may assist the starting of an engine in cold conditions, that may be problematic when used at high altitudes. That is, due to the reduced oxygen at higher altitudes, combustion of both starting fluid and normal fuel still may not be sustainable, and the prior art systems do little to accommodate the lack of oxygen.

The disclosed fuel control system is directed to improving prior art systems.

SUMMARY

In one aspect, the present disclosure is directed to a method of operating an engine. The method may include injecting a primary fuel. The method may further include determining a need for a secondary fuel during starting of the engine and introducing the secondary fuel. The method may still further include determining an engine acceleration rate. The method may also include inhibiting the introduction of the secondary fuel when the engine acceleration rate is below an expected acceleration rate.

In another aspect, the present disclosure is directed to a fuel control system for an engine. The fuel control system may include a fuel injector configured to inject a primary fuel, a valve configured to introduce a secondary fuel, and a controller in communication with the injector and the valve. The controller may be configured to determine a need for secondary fuel during starting of the engine and affect the introduction of secondary fuel based on the need. The controller may further be configured to determine an engine acceleration rate resulting from the introduction of secondary fuel and inhibit the introduction of the secondary fuel when the engine acceleration rate is below an expected acceleration rate.

DETAILED DESCRIPTION

Figure 1:
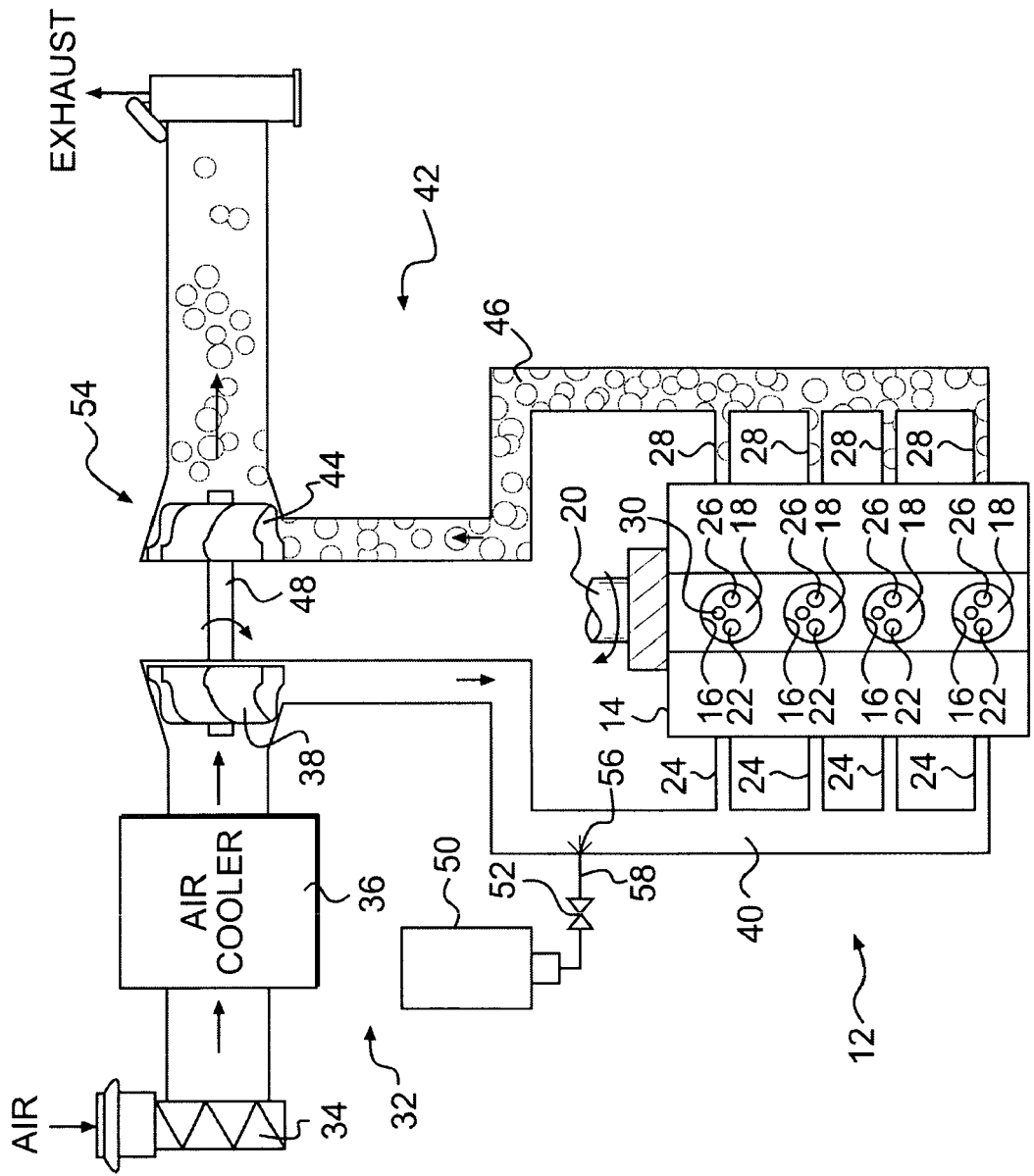
FIG. 1 is a diagrammatic illustration of an exemplary disclosed power system.
Figure 2:
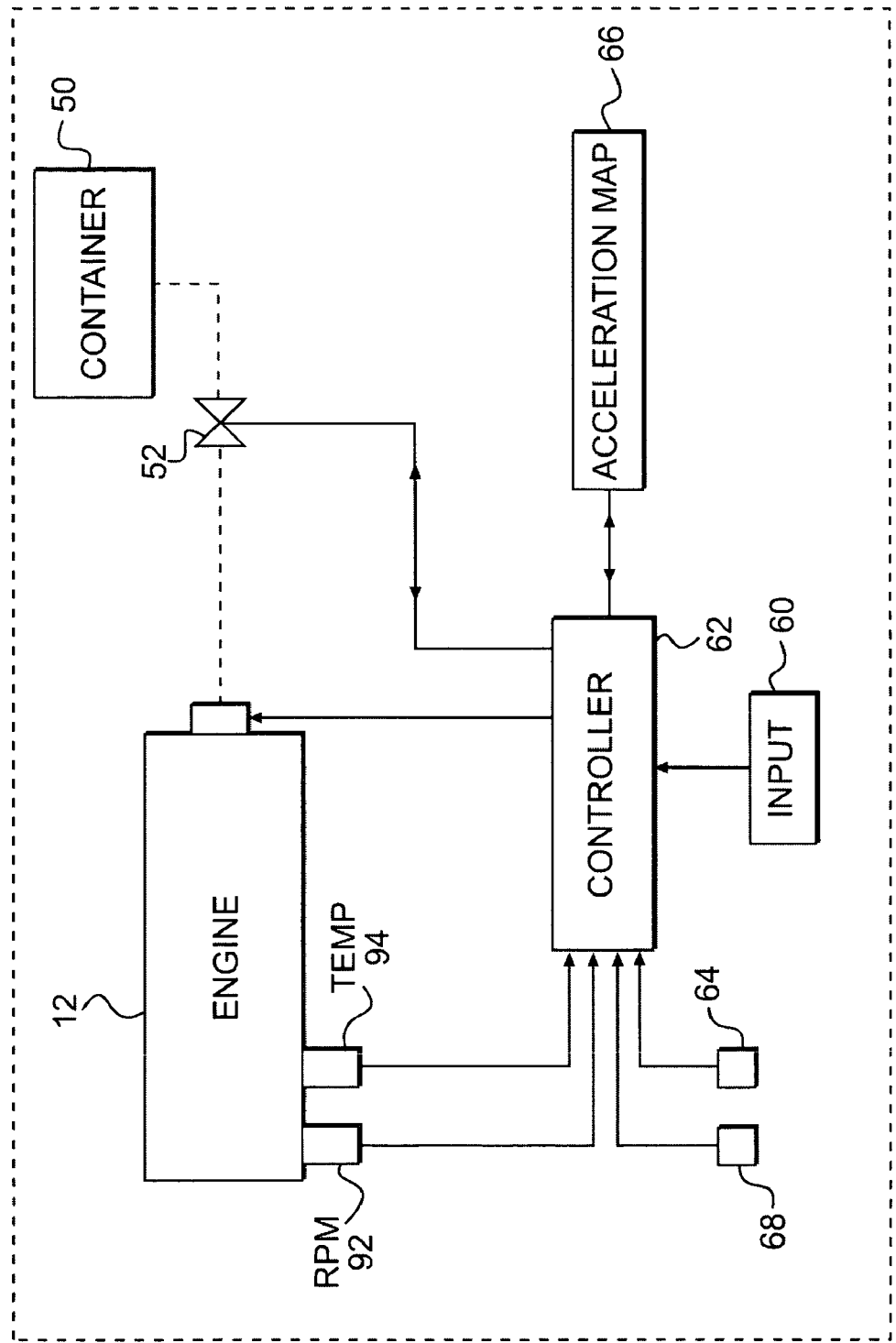
FIG. 2 is a schematic illustration of an exemplary disclosed fuel control system that may be used with the power system of FIG. 1.

FIG. 1 illustrates an exemplary power system 12. Power system 12 is described herein as a diesel-fueled, internal combustion engine. However, it is contemplated that power system 12 may embody any other type of internal combustion engine, such as, for example, a gasoline or gaseous fuel-powered engine. Power system 12 may include an engine block 14 at least partially defining a plurality of cylinders 16, and a plurality of piston assemblies 18 disposed within cylinders 16. It is contemplated that power system 12 may include any number of cylinders 16 and that cylinders 16 may be disposed in an "in-line" configuration, a "V" configuration, or in any other conventional configuration.

Each piston assembly 18 may be configured to reciprocate between a bottom-dead-center (BDC) position or lower-most position within cylinder 16, and a top-dead-center (TDC) position or upper-most position within cylinder 16. In particular, piston assembly 18 may be pivotally coupled to a crankshaft 20 by way of a connecting rod (not shown). Crankshaft 20 of power system 12 may be rotatably disposed within engine block 14, and each piston assembly 18 coupled to crankshaft 20 such that a sliding motion of each piston assembly 18 within each cylinder 16 results in a rotation of crankshaft 20. Similarly, a rotation of crankshaft 20 may result in a sliding motion of piston assemblies 18. As crankshaft 20 rotates through about 180 degrees, piston assembly 18 may move through one full stroke between BDC and TDC. In one embodiment, power system 12 may be a four stroke (e.g., four cycle) engine, wherein a complete cycle includes an intake stroke (TDC to BDC), a compression stroke (BDC to TDC), a power stroke (TDC to BDC), and an exhaust stroke (BDC to TDC). It is also contemplated that power system 12 may alternatively embody a two stroke (e.g., two cycle) engine, wherein a complete cycle includes a compression/exhaust stroke (BDC to TDC) and a power/exhaust/intake stroke (TDC to BDC).

An intake valve 22 may be associated with each cylinder 16 to selectively restrict fluid flow through a respective intake port 24. Each intake valve 22 may be actuated to move or "lift" to thereby open the respective intake port 24. In a cylinder 16 having a pair of intake ports 24 and a pair of intake valves 22, the pair of intake valves 22 may be actuated by a single valve actuator (not shown) or by a pair of valve actuators (not shown). Of the four piston strokes described above, each intake valve 22 may open during a portion of the intake stroke to allow air or an air and fuel mixture to enter each respective cylinder 16.

An exhaust valve 26 may also be associated with each cylinder 16 and configured to selectively block a respective exhaust port 28. Each exhaust valve 26 may be actuated to move or "lift" to thereby open the respective exhaust port 28. In a cylinder 16 having a pair of exhaust ports 28 and a pair of exhaust valves 26, the pair of exhaust valves 26 may be actuated by a single valve actuator (not shown) or by a pair of valve actuators (not shown). Of the four piston strokes described above, each exhaust valve 26 may open during a portion of the exhaust stroke to allow exhaust to be pushed from each respective cylinder 16 by the motion of piston assemblies 18.

Each of intake and exhaust valves 22, 26 may be operated in any conventional manner to move from the closed or flow blocking position to an open or flow-passing position in a cyclical manner. For example, intake and exhaust valves 22, 26 may be lifted by way of a cam (not shown) that is rotatingly driven by crankshaft 20, by way of a hydraulic actuator (not shown), by way of an electronic actuator (not shown), or in any other manner. During normal operation of power system 12, intake and exhaust valves 22, 26 may be lifted in a pre-defined cycle related to the motion of piston assemblies 18. It is contemplated, however, that a variable valve actuator (not shown) may be associated with any one or more of intake and/or exhaust valves 22, 26 to selectively interrupt the cyclical motion thereof during alternative modes of operation. In particular, one or more of intake and/or exhaust valves 22, 26 may be selectively opened, held open, closed, or held closed to implement a compression braking mode of operation, an exhaust gas recirculation mode of operation, a low-NOx mode of operation, an homogenous combustion compression ignition (HCCI) mode of operation, a starting mode of operation, a cold mode of operation, or any other known mode of operation, if desired.

An air induction system 32 may be associated with power system 12 and include components that condition and introduce compressed air into cylinders 16 by way of intake ports 24 and intake valves 22. For example, air induction system 32 may include an air filter 34, an air cooler 36 located downstream of air filter 34, and a compressor 38 connected to draw inlet air through filter 34 and cooler 36. It is contemplated that air induction system 32 may include different or additional components than described above such as, for example, inlet bypass components, a throttle valve, and other known components. It is further contemplated that compressor 38 may be omitted if a naturally aspirated engine is desired.

Air filter 34 may be configured to remove or trap debris from air flowing into power system 12. For example, air filter 34 may include a full-flow filter, a self-cleaning filter, a centrifuge filter, an electro-static precipitator, or any other type of air filtering device known in the art. It is contemplated that more than one air filter 34 may be included within air induction system 32 and disposed in a series or parallel arrangement, if desired. Air filter 34 may be connected to inlet ports 24 via a fluid passageway 40.

Air cooler 36 may embody an air-to-air heat exchanger or an air-to-liquid heat exchanger disposed within fluid passageway 40 and configured to facilitate the transfer of heat to or from the air directed into cylinders 16. For example, air cooler 36 may include a tube-and-shell type heat exchanger, a plate type heat exchanger, a tube-and-fin type heat exchanger, or any other type of heat exchanger known in the art. By cooling the air directed into cylinders 16, a greater amount of air may be drawn into and combusted by power system 12 during any one combustion cycle. The flow of air directed through air cooler 36 may be regulated by an induction valve (not shown) such that a desired flow rate, pressure, and/or temperature at the inlet of power system 12 may be achieved. Although illustrated as being located upstream of compressor 38, it is contemplated that air cooler 36 may alternatively or additionally be located downstream of compressor 38, if desired. It is also contemplated that air cooler 36 may be omitted if desired.

Compressor 38 may also be disposed within fluid passageway 40 and located downstream of air filter 34 to compress the air flowing into power system 12. Compressor 38 may embody a fixed geometry type compressor, a variable geometry type compressor, or any other type of compressor known in the art. It is contemplated that more than one compressor 38 may be included within air induction system 32 and disposed in parallel or in series relationship, if desired.

An exhaust system 42 may also be associated with power system 12, and include components that condition and direct exhaust from cylinders 16 by way of exhaust ports 28 and exhaust valves 26. For example, exhaust system 42 may include a turbine 44 disposed within a passageway 46 and driven by the exiting exhaust before it is directed to the atmosphere. It is contemplated that exhaust system 42 may include different or additional components than described above such as, for example, exhaust bypass components, an exhaust gas recirculation circuit, an exhaust brake, and other known components.

Turbine 44 may also be disposed within fluid passageway 46 and located to receive exhaust leaving power system 12 via exhaust ports 28. Turbine 44 may be connected to one or more compressors 38 of air induction system 32 by way of a common shaft 48 to form a turbocharger 54. As the hot exhaust gases exiting power system 12 move through passageway 46 to turbine 44 and expand against vanes (not shown) thereof, turbine 44 may rotate and drive the connected compressor 38 to pressurize inlet air. It is contemplated that more than one turbine 44 may be included within exhaust system 42 and disposed in parallel or in series relationship, if desired.

A plurality of fuel injectors 30 may be associated with cylinders 16 to selectively inject pressurized fuel into corresponding combustion chambers (not shown). Fuel injectors 30 may be configured to inject fuel at a timing relative to the angle of crankshaft 20. The timing, quantity, and/or pressure of each injection may correspond with a particular mode of engine operation; a performance parameter of power system 12 such as engine speed, engine loading, engine temperature, and engine boost pressure; an ambient condition such as temperature, pressure, or an altitude; and/or other factors known in the art. One or more of sensors 92, 94, 64, and 68 may be associated with power system 12 to generate signals indicative of these parameters.

While fuel injectors 30 may inject a primary fuel, for example diesel fuel, directly into the combustion chambers of power system 12, a secondary fuel may be introduced into the combustion chambers by way of induction system 32. The secondary fuel may be introduced instead of or in addition to the primary fuel. In one example, the secondary fuel may include a starting fluid such as diethyl ether, dimethyl ether, or a mixture of diethyl and dimethyl ether, which may be stored in a container 50. The secondary fuel may flow or otherwise be sprayed into fluid passageway 40 through a line 58. A valve 52 may be disposed in line 58 between container 50 and fluid passageway 40 to selectively restrict the flow of secondary fuel into fluid passageway 40. A sensor (not shown) may be situated to sense an extent to which valve 52 is open and send a signal indicative thereof to controller 62. The extent to which valve 52 is open may correspond with a particular mode of engine operation; a performance parameter of power system 12; an ambient condition; and/or other factors known in the art. Secondary fuel that flows into fluid passageway 40 may pass through an atomizer 56. Atomizer 56 may be located to reduce the starting fluid into fine particles as it enters fluid passageway 40 such that it may mix uniformly with the compressed air in fluid passageway 40.

An operator interface device 60 may be associated with power system 12 for manual regulation of the starting fluid. Operator interface device 60 may be configured to receive an input from a machine operator indicative of a desire to start power system 12. Alternatively it is contemplated that the input could be a computer generated command from an automated system that assists the operator, or a command from an autonomous system that operates in place of the operator. Operator interface device 60 may include a wheel, a knob, a push-pull device, a switch, or another operator interface device known in the art. Operator interface device may be in communication with controller 62.

Controller 62 may be configured to adjust the operation of power system 12 based on the input from operator interface device 60, one or more sensed performance parameters or modes of operation of power system 12, an ambient condition, the sensed position of valve 52, and/or information contained in one or more electronic maps. The electronic maps may contain tabulated values relating expected acceleration rates to a required movement of valve 52. In one example, the maps may be two dimensional, may be indexed according to an ambient air pressure or altitude, and may relate expected acceleration rates to a coolant temperature. In another example, the maps may be two-dimensional and may relate the expected acceleration rate to an ambient air pressure or altitude. In another example, the maps may be three-dimensional and may relate expected acceleration rate to an ambient air pressure or altitude, and a coolant temperature. Controller 62 may adjust the position of valve 52 based on the maps, signals generated by sensors 92, 94, 64, and 68, and the sensor associated with valve 52.

By way of example, controller 62 may receive a signal from sensor 68 indicating that the ambient temperature may be too low for efficient starting of power system 12 and, in response thereto, controller 62 may open valve 52 to utilize the secondary fuel. In another example, controller 62 may receive a signal from sensor 92 indicating the speed of power system 12. From the speed of power system 12, controller 62 may determine an acceleration of power system 12 and compare the acceleration rate to an expected acceleration rate contained within the electronic map. In one embodiment, the expected acceleration rates may be indexed to a current operating altitude of power system 12. It is contemplated that the expected acceleration rate may be further indexed to a current coolant temperature of power system 12. Based on these received signals and the comparison, controller 62 may modify the position of valve 52 accordingly to facilitate starting and/or operation of power system 12 with the use of the secondary fuel.

Controller 62 may embody a single microprocessor or multiple microprocessors that include a means for controlling an operation of power system 12. Numerous commercially available microprocessors can be configured to perform the functions of controller 62. It should be appreciated that controller 62 could readily embody a general machine microprocessor capable of controlling numerous functions. Controller 62 may include a memory, a secondary storage device, a processor, and any other components for running an application. Various other circuits may be associated with controller 62 such as power supply circuitry, signal conditioning circuitry, solenoid driver circuitry, and other types of circuitry.

Figure 3:
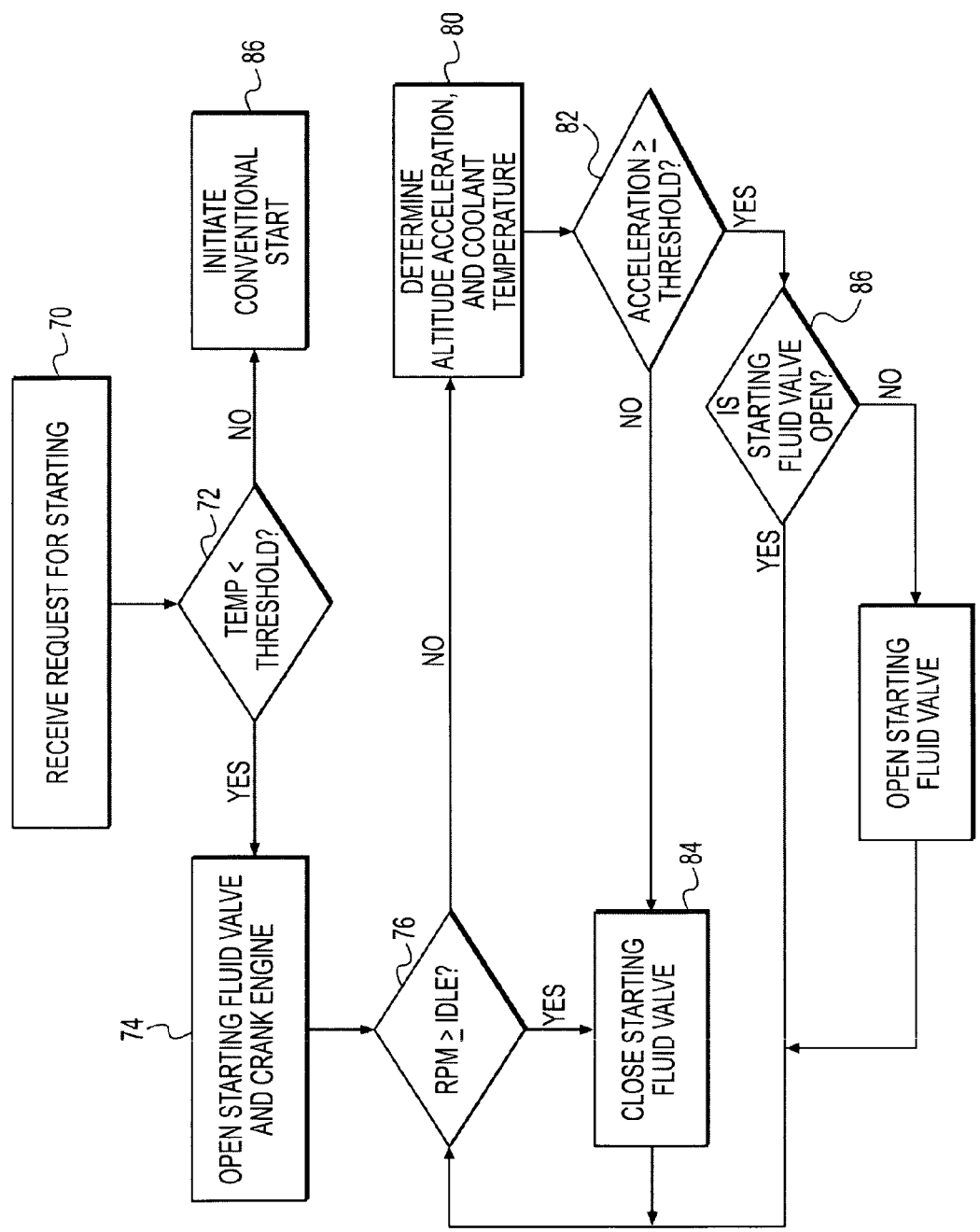
FIG. 3 is a flow diagram illustrating an exemplary disclosed method of operating the fuel control system of FIG. 2.

FIG. 3 shows a flow-diagram illustrating a method of controlling fuel injection and starting fluid introduction. FIG. 3 will be discussed in detail in the following section.

INDUSTRIAL APPLICABILITY

The disclosed fuel control system may be used in connection with any engine where it is desirable to assist starting and/or operation in cold weather at high altitudes. The disclosed fuel control system may selectively introduce a secondary fuel based on the acceleration of the engine and a coolant or ambient temperature. By selectively introducing the secondary fuel, the engine may receive the cold starting benefits from the starting fluid at high altitudes where the amount of oxygen may be reduced. In this manner, the disclosed fuel control system may allow the engine to start more consistently and operate more efficiently, while simultaneously reducing wear on the engine.

FIG. 3 is a flow diagram illustrating an exemplary disclosed method of operating the fuel control system. An operator may input a command to start power system 12 via operator input device 60 and controller 62 may receive a signal indicative of that command (Step 70). When starting power system 12 in the presence of diesel fuel only (i.e. normal conditions), the flow of the secondary fuel into fluid passageway 40 may be inhibited during starting. This may be described as a conventional start. However, under cold conditions (e.g. temperatures less than 32° F.), fluid passageway 40 may introduce compressed air and the secondary fuel into power system 12. This may be described as a cold start. Controller 62 may determine whether to perform a conventional start of power system 12 or a cold start of power system 12, based on a signal indicative of an ambient temperature received from sensor 68 (Step 72).

When the ambient temperature is above a threshold temperature, controller 62 may initiate a conventional start of power system 12 (Step 86). When the ambient temperature is below the threshold temperature, controller 62 may open valve 52 and attempt a cold start of power system 12 (Step 74). During starting, controller 62 may monitor the speed of power system 12 and regulate operation thereof accordingly (Step 76). When the speed of power system 12 meets or exceeds the idle speed, controller 62 may close valve 52 and continue operation of power system 12 under normal conditions (Step 84).

If, during step 76, it is determined that the speed of power system 12 is less than expected (i.e. less than an idle speed or minimum threshold), controller 62 may determine the current altitude of power system 12, the acceleration of power system 12, and the coolant temperature of power system 12 (step 80). An acceleration of power system 12 that is greater than an expected acceleration rate may indicate that there may be sufficient oxygen to support the use of the secondary fuel, and valve 52 may remain open until power system 12 exceeds the idle speed (Step 82). However, an acceleration of power system 12 that is less than the expected acceleration rate may indicate that there is insufficient oxygen to support the use of the secondary fuel, and controller 62 may close valve 52 and inhibit the introduction of secondary fuel into power system 12 (Step 84). Following step 84, control may return to step 76. If, after step 82, the acceleration of power system 12 is greater than the expected acceleration rate and valve 52 is closed, controller 62 may reopen valve 52 and control may return to step 76.

An example illustrating how the above described method may function will now be provided. In this example the ambient temperature may be 25° F. and controller 62 may receive a command to start power system 12. Because the temperature is less than a threshold temperature of 32° F., controller 62 may open valve 52 to introduce the secondary fuel and may attempt to cold start power system 12. As cranking of power system 12 is initiated, combustion takes place and, the speed of the power system 12 may increase to 500 RPM. However, because the speed of power system 12 is below an idle speed of 700 RPM, controller 62 may check the current altitude, acceleration, and coolant temperature of power system 12. With the current altitude being 6000 feet, acceleration being 500 $RPM^2$, and coolant temperature being 20° F., controller 62 may close valve 52 to inhibit the secondary fuel because there may be too little oxygen available for proper combustion of the secondary fuel. After closing valve 52 the speed of power system 12 may increase to 800 RPM and because the speed is above the idle speed of 700 RPM, controller 62 may inhibit the introduction of the secondary fuel and henceforth operate power system 12 under normal conditions.

Several advantages of the disclosed fuel control system may be realized. One advantage may be that by selectively introducing the secondary fuel, the engine may start in cold conditions at high altitudes where the amount of oxygen may be reduced. Specifically, because the combustion of a primary and a secondary fuel may use more oxygen than is available, the disclosed fuel control system may inhibit the introduction of the secondary fuel after the engine has received the cold starting benefits. In this manner, the disclosed fuel control system may allow the engine to start more consistently and operate more efficiently, while simultaneously reducing wear on the engine.

It will be apparent to those skilled in the art that various modifications and variations can be made to the fuel control system of the present disclosure. Other embodiments of the fuel control system will be apparent to those skilled in the art from consideration of the specification and practice of the injection system disclosed herein. By way of example, it would be apparent to those skilled in the art that variations of starting fluid or fluids not containing ether mixtures may be used as a starting aid. It is intended that the specification and examples be considered as exemplary only, with a true scope being indicated by the following claims and their equivalents.

What is claimed is:

1. A method of operating an engine, the method comprising:
   injecting a primary fuel;
   determining a need for a secondary fuel during starting of the engine;
   introducing the secondary fuel based on the need;
   monitoring an engine condition indicative of whether an oxygen level in the engine is sufficient to support the combustion of the secondary fuel; and
   inhibiting the introduction of the secondary fuel when the engine condition indicates that the oxygen level in the engine is insufficient to support the combustion of the secondary fuel,
   wherein the engine condition includes an engine acceleration, and monitoring an engine condition further includes:
      determining the engine acceleration resulting from the primary fuel injection and the secondary fuel introduction, and
      comparing the determined engine acceleration to an expected engine acceleration.

2. The method of claim 1, further including:
   receiving a signal indicative of an altitude; and
   determining an expected acceleration based on the altitude.

3. The method of claim 2, further including receiving a signal indicative of a coolant temperature and wherein the expected acceleration is further based on the coolant temperature.

4. The method of claim 2, further including reintroducing the secondary fuel if the determined engine acceleration exceeds the expected acceleration.

5. The method of claim 1, wherein inhibiting the introduction of the secondary fuel when the oxygen level in the engine is insufficient to support the combustion of the secondary fuel includes inhibiting the introduction of the secondary fuel when the determined engine acceleration is below an expected acceleration.

6. The method of claim 5, wherein the expected acceleration is based on one or more of a sensed altitude of the engine and a sensed coolant temperature of the engine.

7. The method of claim 1, wherein the primary fuel is a diesel fuel and the secondary fuel is a starting fluid.

8. The method of claim 1, wherein determining a need for a secondary fuel includes determining an ambient temperature, and wherein a need exists if the ambient temperature is below a threshold temperature.

9. A fuel control system for an engine, comprising:
   a fuel injector configured to inject a primary fuel;
   a valve configured to introduce a secondary fuel; and
   a controller in communication with the injector and valve, the controller being configured to:
      determine a need for the secondary fuel during starting of the engine;
      affect the introduction of the secondary fuel based on the need;
      determine an engine acceleration resulting from the primary fuel injection and the secondary fuel introduction, wherein the determined engine acceleration is indicative of whether the oxygen level in the engine is below a level that supports the combustion of the secondary fuel;
      compare the determined engine acceleration to an expected acceleration rate, wherein the expected acceleration rate is based, at least in part, on an altitude of the engine; and
      inhibit the introduction of the secondary fuel when the determined engine acceleration rate is below an expected acceleration rate.

10. The system of claim 9, further including a sensor configured to generate a signal indicative of an altitude, wherein the controller is configured to determine the expected acceleration based on the signal.

11. The system of claim 10, wherein the controller includes an electronic map relating the expected acceleration to an altitude.

12. The system of claim 10, further including a sensor configured to generate a signal indicative of a coolant temperature and wherein the expected acceleration is further based on the signal.

13. The system of claim 9, further including a sensor configured to generate a signal indicative of an ambient temperature.

14. The system of claim 13, wherein the need for a secondary fuel is based on the signal.

15. The system of claim 9, wherein the controller is further configured to reintroduce the secondary fuel if the determined engine acceleration exceeds the expected acceleration.

16. The system of claim 9, wherein the primary fuel is a diesel fuel and the secondary fuel is a starting fluid.

17. An internal combustion engine, comprising:
   an engine block having at least one combustion chamber;

a fuel injector configured to inject a pressurized primary fuel into the combustion chamber;

a valve configured to introduce a secondary fuel;

a first sensor configured to generate a signal indicative of an ambient temperature;

a second sensor configured to generate a signal indicative of an altitude; and a controller in communication with the first and second sensors, and the valve, and the fuel injector, the controller being configured to:

affect injection of the primary fuel;

introduce the secondary fuel during starting of the engine based on the ambient temperature;

determine an engine acceleration resulting from the primary fuel injection and the secondary fuel introduction, wherein the determined engine acceleration is indicative of whether the oxygen level in the engine is below a level that supports the combustion of the secondary fuel; and selectively inhibit the introduction of the secondary fuel when the determined engine acceleration is below an expected acceleration.

18. The engine of claim 17, wherein the controller is configured to determine the expected acceleration by referring to an electronic map stored in a memory, the electronic map relating the altitude to the expected acceleration.

19. The engine of claim 17, wherein the controller is further configured to reintroduce the starting fluid if the determined engine acceleration exceeds the expected acceleration.

20. The engine of claim 17, wherein the primary fuel is a diesel fuel and the secondary fuel is a starting fluid.

* * * * *

UNITED STATES PATENT AND TRADEMARK OFFICE
CERTIFICATE OF CORRECTION

| | | |
|---|---|---|
| PATENT NO. | : 7,757,651 B2 | |
| APPLICATION NO. | : 12/003653 | |
| DATED | : July 20, 2010 | |
| INVENTOR(S) | : Fitchpatrick et al. | |

It is certified that error appears in the above-identified patent and that said Letters Patent is hereby corrected as shown below:

Drawings should read as follows:

Sheet 3 of 3, Figure 3, Line 1 (Above the text "IS STARTING FLUID VALVE OPEN?"), delete "86" and insert -- 88 --.

Signed and Sealed this
Twelfth Day of July, 2011

David J. Kappos
*Director of the United States Patent and Trademark Office*